United States Patent
Chen et al.

(10) Patent No.: US 11,452,075 B2
(45) Date of Patent: *Sep. 20, 2022

(54) REGIONAL AND NARROW BAND COMMON REFERENCE SIGNAL (CRS) FOR USER EQUIPMENT (UE) RELAYS

(71) Applicant: QUALCOMM Incorporated, San Diego, CA (US)

(72) Inventors: Wanshi Chen, San Diego, CA (US); Aleksandar Damnjanovic, Del Mar, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/007,226

(22) Filed: Aug. 31, 2020

(65) Prior Publication Data

US 2020/0404627 A1 Dec. 24, 2020

Related U.S. Application Data (63) Continuation of application No. 13/750,735, filed on Jan. 25, 2013, now Pat. No. 10,791,542.

(Continued)

(51) Int. Cl.
*H04W 4/00* (2018.01)
*H04W 72/04* (2009.01)
(Continued)

(52) U.S. Cl.
CPC ............ *H04W 72/04* (2013.01); *H04L 5/005* (2013.01); *H04W 72/042* (2013.01);
(Continued)

(58) Field of Classification Search
CPC ... H04W 72/04; H04W 72/042; H04W 88/04; H04L 5/005; H04L 5/0053; H04L 5/003; H04L 5/0023
(Continued)

(56) References Cited

U.S. PATENT DOCUMENTS 10,560,235 B2   2/2020   Chen et al.
10,791,542 B2 *  9/2020   Chen .................. H04W 72/042
(Continued)

FOREIGN PATENT DOCUMENTS

CN       101873609 A     10/2010
KR     20110007986 A      1/2011
(Continued)

OTHER PUBLICATIONS

Alcatel-Lucent Shanghai Bell, et al., "Type II Relay Considerations with the Separation of Control and Data", 3GPP TSG RAN WG1 #58, 3GPP Draft; R1-093357 Type II Relay Considerations with the Separation of Control and Data, 3rd Generation Partnership Project (3GPP), Mobile Competence Centre; 650, Route Des Lucioles; F-06921 Sophia-Antipolis Cedex; France, vol. RAN WG1, No. Shenzhen; Aug. 24, 2009-Aug. 28, 2009, Aug. 19, 2009 (Aug. 19, 2009), pp. 1-8, XP050597653, [retrieved on Aug. 19, 2009].

(Continued)

*Primary Examiner* — Chuong T Ho
(74) *Attorney, Agent, or Firm* — Patterson+ Sheridan, L.L.P.

(57) ABSTRACT

Certain aspects of the present disclosure relate to techniques for assigning resources for common reference signal (CRS) transmissions from user equipment (UE) relays. Aspects of the present disclosure provide techniques to use minimum possible resources for transmission of CRS in an attempt to reduce interference, reduce power consumption while providing appropriate reference for channel measurement and (Continued)

demodulation. In an aspect, a wireless node (e.g., a UE relay station) may determine resources for transmission of CRS in a subframe based, at least in part, on a type of one or more channels to be transmitted in the subframe, and may transmit the CRS using the determined resources.

20 Claims, 10 Drawing Sheets

Related U.S. Application Data (60) Provisional application No. 61/591,828, filed on Jan. 27, 2012.

(51) Int. Cl.
  *H04L 5/00* (2006.01)
  *H04W 88/04* (2009.01)
(52) U.S. Cl.
  CPC ............ *H04L 5/003* (2013.01); *H04L 5/0023* (2013.01); *H04L 5/0053* (2013.01); *H04W 88/04* (2013.01)
(58) Field of Classification Search
  USPC .................................................. 370/329, 330
  See application file for complete search history.

(56) References Cited

U.S. PATENT DOCUMENTS

| | | | |
|---|---|---|---|
| 2010/0120442 A1 | 5/2010 | Zhuang et al. | |
| 2010/0323684 A1 | 12/2010 | Cai et al. | |
| 2011/0211595 A1 | 9/2011 | Geirhofer et al. | |
| 2011/0256861 A1 | 10/2011 | Yoo et al. | |
| 2011/0268064 A1 | 11/2011 | Chen et al. | |
| 2011/0268101 A1 | 11/2011 | Wang et al. | |
| 2012/0087299 A1 | 4/2012 | Bhattad et al. | |
| 2012/0093061 A1 | 4/2012 | Charbit et al. | |
| 2012/0207126 A1 | 8/2012 | Qu et al. | |
| 2012/0302254 A1 | 11/2012 | Charbit et al. | |
| 2013/0003672 A1 | 1/2013 | Dinan | |
| 2013/0039299 A1 | 2/2013 | Papasakellariou et al. | |
| 2013/0114435 A1* | 5/2013 | Wang .................. | H04B 7/0413 370/252 |
| 2013/0142138 A1 | 6/2013 | Dinan | |
| 2013/0176952 A1 | 7/2013 | Shin et al. | |
| 2013/0195043 A1* | 8/2013 | Chen .................. | H04W 72/042 370/329 |
| 2013/0208604 A1 | 8/2013 | Lee et al. | |
| 2013/0223258 A1 | 8/2013 | Seo et al. | |
| 2014/0314041 A1* | 10/2014 | Kim .................... | H04L 25/0224 370/329 |
| 2014/0321423 A1 | 10/2014 | Kalhan | |
| 2014/0348015 A1 | 11/2014 | Seo et al. | |
| 2015/0043520 A1* | 2/2015 | Sun ......................... | H04L 5/005 370/330 |
| 2015/0146629 A1 | 5/2015 | Ranta-Aho et al. | |
| 2016/0127097 A1 | 5/2016 | Chen et al. | |
| 2017/0201982 A1 | 7/2017 | Rico Alvarino et al. | |
| 2019/0028245 A1* | 1/2019 | Gao ...................... | H04W 48/12 |

FOREIGN PATENT DOCUMENTS

| | | |
|---|---|---|
| KR | 20110019330 A | 2/2011 |
| KR | 20120004460 A | 1/2012 |
| WO | 2010107242 A2 | 9/2010 |
| WO | 2010148119 A2 | 12/2010 |
| WO | 2011119765 A1 | 9/2011 |
| WO | 2012112614 A1 | 8/2012 |
| WO | 2013044948 A1 | 4/2013 |

OTHER PUBLICATIONS

International Preliminary Report on Patentability—PCT/US2013/023325, International Search Authority—European Patent Office, dated Aug. 7, 2009.

International Search Report and Written Opinion—PCT/US2013/023325—ISA/EPO—dated May 31, 2013.

Kim J., et al., "Optimal relaying strategy for UE relays" Communications (APCC), 2011 17th Asia-Pacific Conference ON, IEEE, Oct. 2, 2011 (Oct. 2, 2011). pp. 192-196. XP032115953, DOI: 10.1109/APCC.2011.6152803 ISBN: 978-1-4577-0389-8.

Seo, Inkwon; U.S. Appl. No. 61/569,779 for Measurement Restriction for Neighbor Cell Measurement; Dec. 12, 2011.

ZTE: "Discussion on some issues of additional carrier types". 3GPP Draft; R1-113754 Discussion on Some Issues of Additional Carrier Types. 3rd Generation Partnership Project (3GPP). Mobile Competence Centre ; 650. Route Des Lucioles ; F-06921 Sophia-Antipolis Cedex ; France, vol. RAN WG1. No. San Francisco. USA; Nov. 14, 2011-Nov. 18, 2011. Nov. 8, 2011 (Nov. 8, 2011). XP050561867. [retrieved on Nov. 8, 2011].

\* cited by examiner

REGIONAL AND NARROW BAND COMMON REFERENCE SIGNAL (CRS) FOR USER EQUIPMENT (UE) RELAYS

CROSS-REFERENCE TO RELATED APPLICATIONS

This application is a continuation of U.S. patent application Ser. No. 13/750,735, entitled "REGIONAL AND NARROW BAND COMMON REFERENCE SIGNAL (CRS) FOR USER EQUIPMENT (UE) RELAYS," filed Jan. 25, 2013, which claims benefit of U.S. Provisional Patent Application Ser. No. 61/591,828, entitled "REGIONAL AND NARROW BAND COMMON REFERENCE SIGNAL (CRS) FOR USER EQUIPMENT (UE) RELAYS," filed Jan. 27, 2012, both of which are assigned to the assignee hereof, and both of which are expressly incorporated by reference herein.

BACKGROUND

I. Field

Certain aspects of the disclosure generally relate to wireless communications and, more particularly, to techniques for assigning resources for common reference signal (CRS) transmissions from user equipment (UE) relays.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

Certain aspects of the present disclosure provide a method of wireless communications by a wireless node. The method generally includes determining resources for transmission of a common reference signal (CRS) in a subframe based, at least in part, on a type of one or more channels to be transmitted in the subframe, and transmitting the CRS using the determined resources.

Certain aspects of the present disclosure provide an apparatus for wireless communications. The apparatus generally includes means for determining resources for transmission of a common reference signal (CRS) in a subframe based, at least in part, on a type of one or more channels to be transmitted in the subframe, and means for transmitting the CRS using the determined resources.

Certain aspects of the present disclosure provide an apparatus for wireless communication. The apparatus generally includes at least one processor and a memory coupled to the at least one processor. The at least one processor is generally configured to determine resources for transmission of a common reference signal (CRS) in a subframe based, at least in part, on a type of one or more channels to be transmitted in the subframe, and transmit the CRS using the determined resources.

Certain aspects of the present disclosure provide a computer-readable medium generally including code for determining resources for transmission of a common reference signal (CRS) in a subframe based, at least in part, on a type of one or more channels to be transmitted in the subframe, and code for transmitting the CRS using the determined resources.

Certain aspects of the present disclosure provide a method of wireless communications by a UE. The method generally includes determining resources available for transmission of common reference signal (CRS) in a subframe based, at least in part, on a type of one or more functions the UE is to perform with reference to the subframe, and processing the subframe based on the determination.

Certain aspects of the present disclosure provide an apparatus for wireless communication. The apparatus generally includes means for determining resources available for transmission of common reference signal (CRS) in a subframe based, at least in part, on a type of one or more functions the UE is to perform with reference to the subframe, and means for processing the subframe based on the determination.

Certain aspects of the present disclosure provide an apparatus for wireless communications. The apparatus generally includes at least one processor and a memory coupled to the at least one processor. The at least one processor is generally configured to determine resources available for transmission of common reference signal (CRS) in a subframe based, at least in part, on a type of one or more functions the UE is to perform with reference to the subframe, and process the subframe based on the determination.

Certain aspects of the present disclosure provide a computer-readable generally including code for determining resources available for transmission of common reference signal (CRS) in a subframe based, at least in part, on a type of one or more functions the UE is to perform with reference to the subframe, and code for processing the subframe based on the determination.

Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below.

Example Wireless Network

Figure 1:
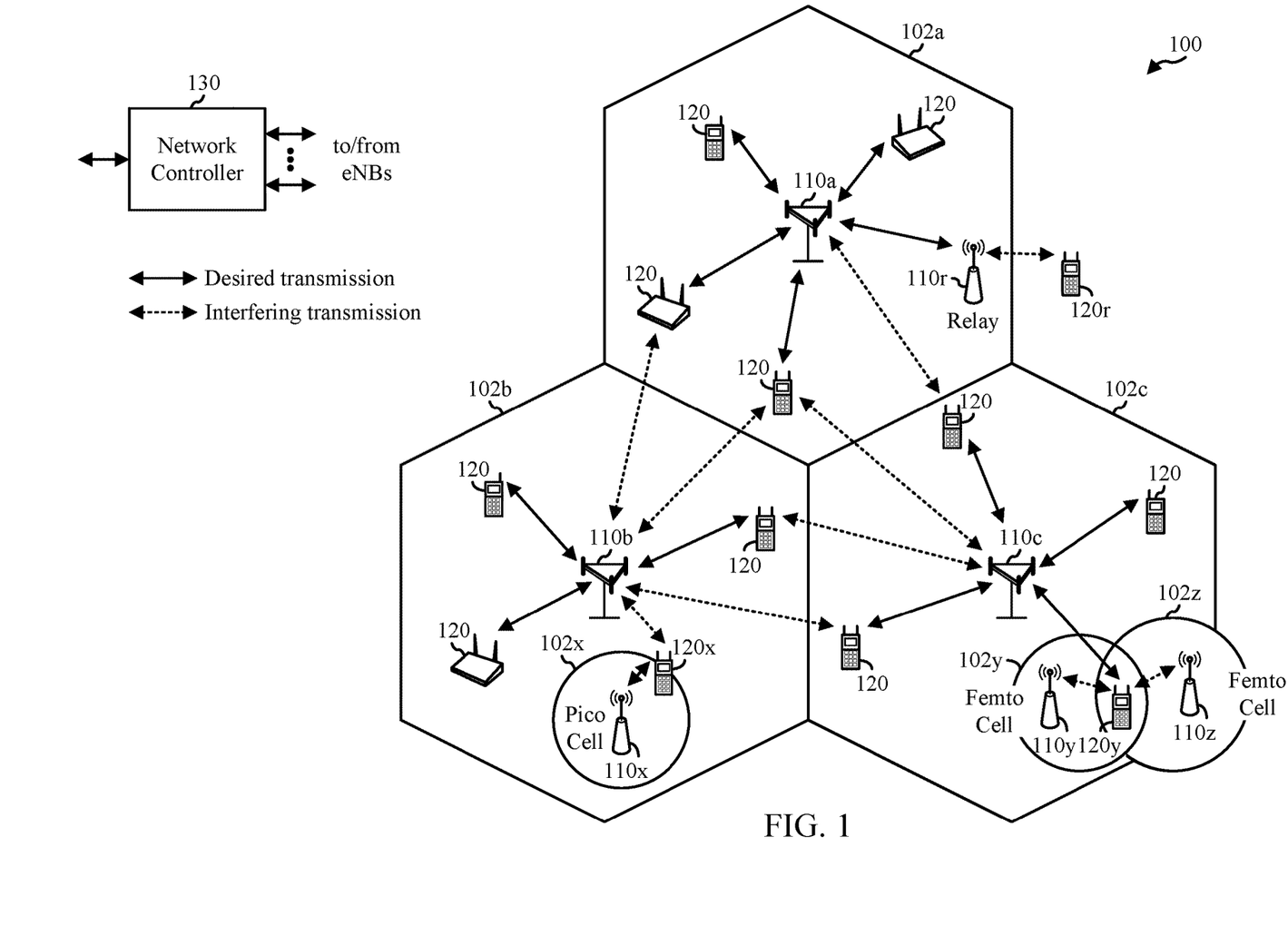
FIG. 1 is a block diagram conceptually illustrating an example of a wireless communications network in accordance with certain aspects of the present disclosure.

FIG. 1 shows a wireless communication network 100, which may be an LTE network. The wireless network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB (i.e., a macro base station). An eNB for a pico cell may be referred to as a pico eNB (i.e., a pico base station). An eNB for a femto cell may be referred to as a femto eNB (i.e., a femto base station) or a home eNB. In the example shown in FIG. 1, eNBs 110a, 110b, and 110c may be macro eNBs for macro cells 102a, 102b, and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE (e.g. UE relay station) that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

The wireless network 100 may be a heterogeneous network (HetNet) that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with eNBs 110 via a backhaul. The eNBs 110 may also communicate with one another, e.g., directly or indirectly via wireless or wireline backhaul.

The UEs 120 (e.g., 120x, 120y) may be dispersed throughout the wireless network 100, and each UE may be stationary or mobile. A UE may also be referred to as a terminal, a mobile station, a subscriber unit, a station, etc. A UE may be a cellular phone, a smart phone, a personal digital assistant (PDA), a wireless modem, a wireless communication device, a handheld device, a laptop/notebook computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB. For certain aspects, the UE may comprise an LTE Release 10 UE.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

Figure 2:
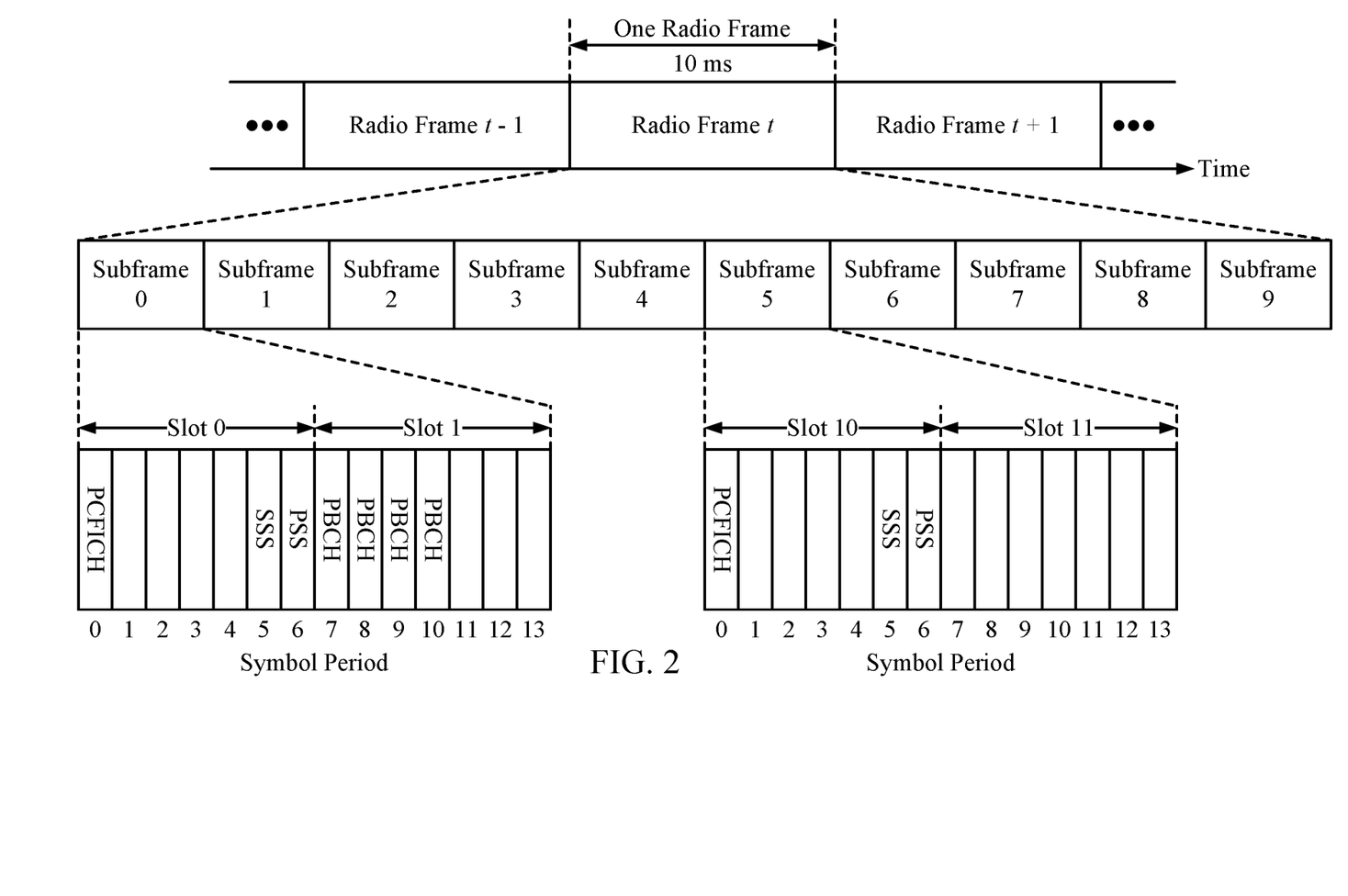
FIG. 2 is a block diagram conceptually illustrating an example of a frame structure in a wireless communications network in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
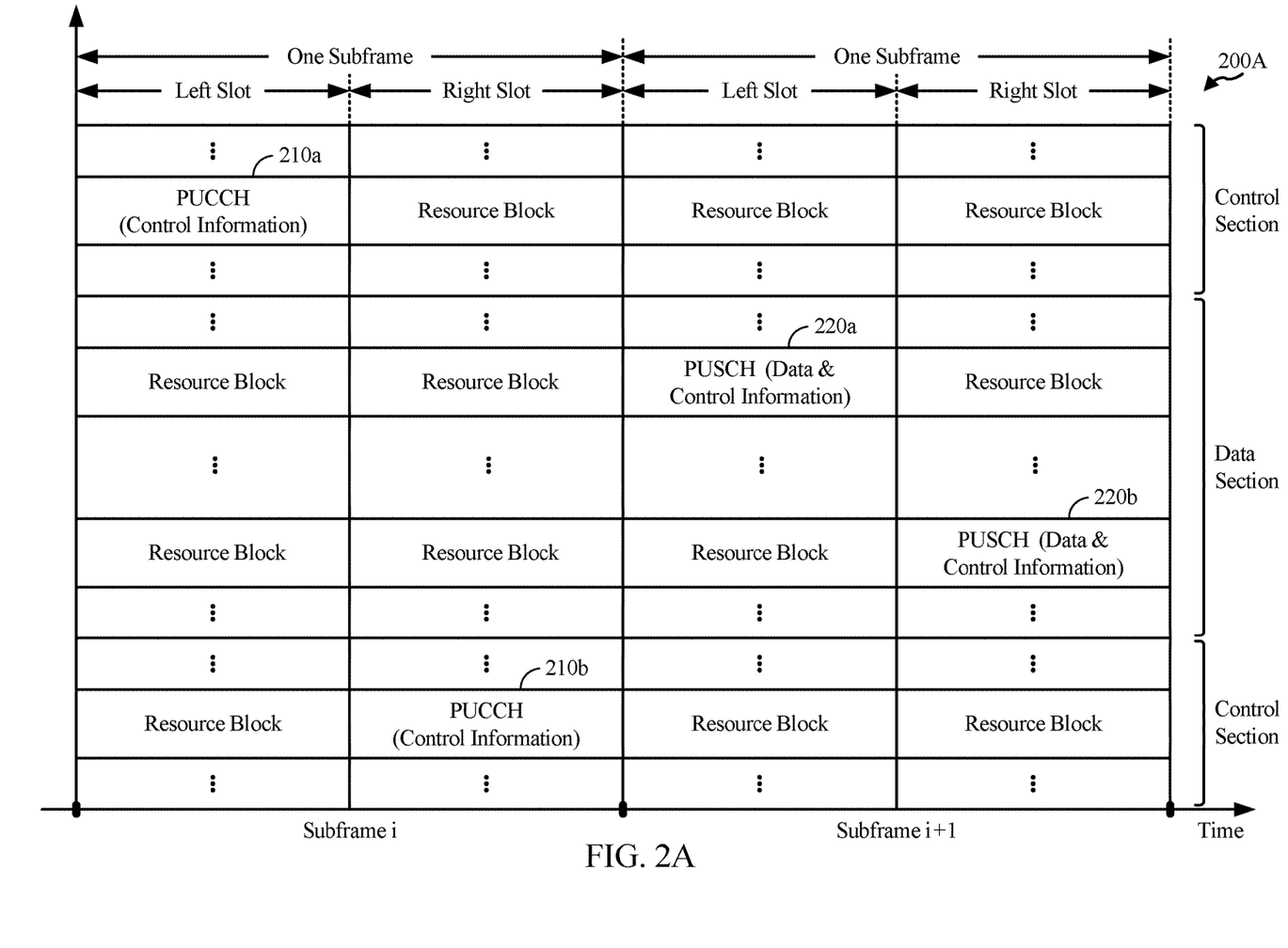
FIG. 2A shows an example format for the uplink in Long Term Evolution (LTE) in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNB. The UE may transmit control information in a Physical Uplink Control Channel (PUCCH) 210a, 210b on the assigned resource blocks in the control section. The UE may transmit only data or both data and control information in a Physical Uplink Shared Channel (PUSCH) 220a, 220b on the assigned resource blocks in the data section. An uplink transmission may span both slots of a subframe and may hop across frequency as shown in FIG. 2A.

A UE may be within the coverage of multiple eNBs. One of these eNBs may be selected to serve the UE. The serving eNB may be selected based on various criteria such as received power, pathloss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower pathloss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the pathloss for eNB 110x is lower than the pathloss for macro eNB 110b. This may result in less interference to the wireless network for a given data rate for UE 120x.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the received power of signals from the eNB received at a UE (and not based on the transmit power level of the eNB).

Figure 3:
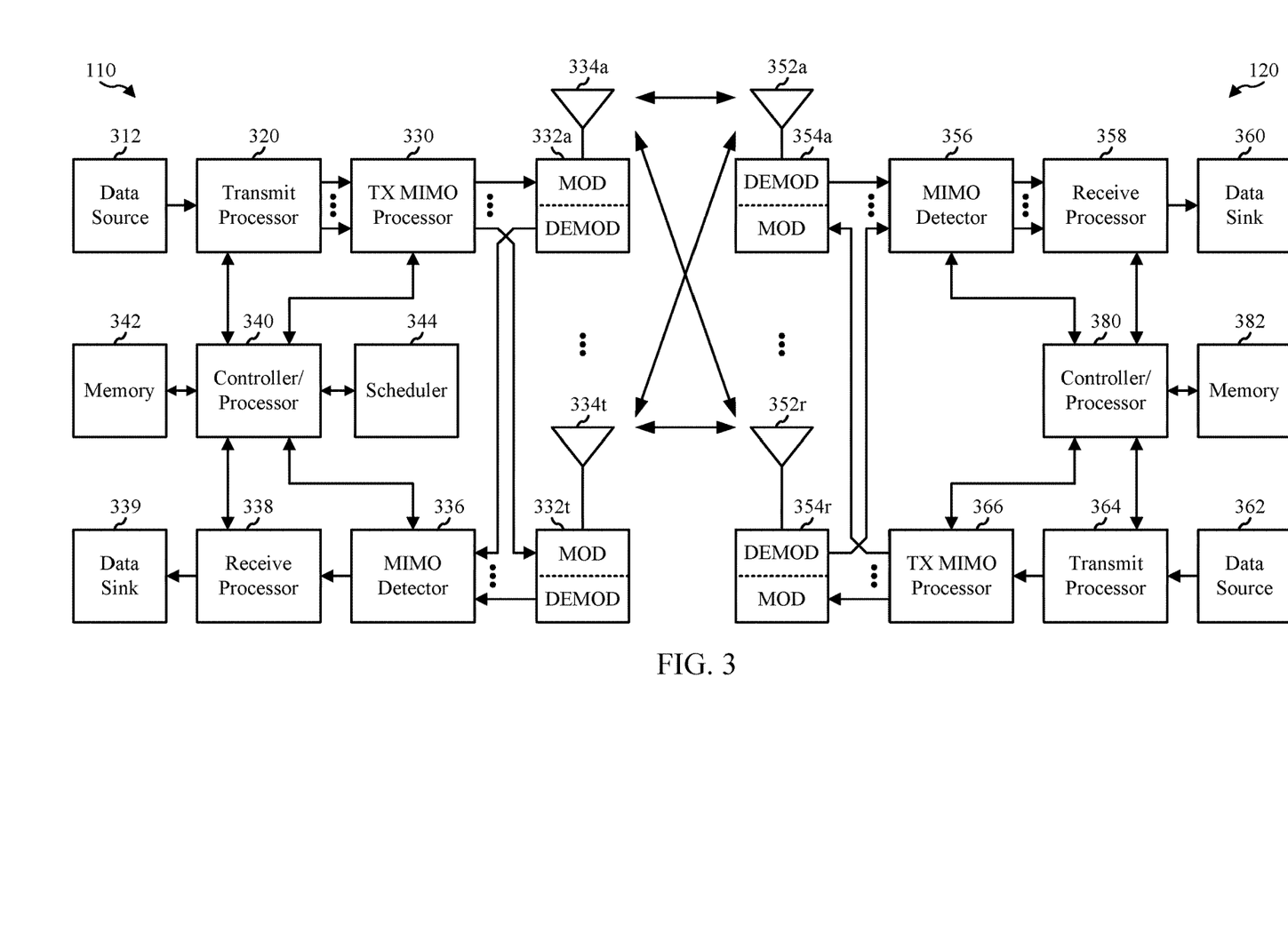
FIG. 3 shows a block diagram conceptually illustrating an example of a Node B in communication with a user equipment device (UE) in a wireless communications network in accordance with certain aspects of the present disclosure.

FIG. 3 is a block diagram of a design of a base station or an eNB 110 and a UE 120, which may be one of the base stations/eNBs and one of the UEs in FIG. 1. For a restricted association scenario, the eNB 110 may be macro eNB 110c in FIG. 1, and the UE 120 may be UE 120y. The eNB 110 may also be a base station of some other type. The eNB 110 may be equipped with T antennas 334a through 334t, and the UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the eNB 110 and the UE 120, respectively. The controller/processor 340, receive processor 338, and/or other processors and modules at the eNB 110 may perform or direct operations 900 and 1000 in FIGS. 9 and 10, and/or other processes for the techniques described herein. The memories 342 and 382 may store data and program codes for the eNB 110 and the UE 120, respectively. A scheduler 344 may schedule UEs for data transmission on the downlink and/or uplink. eNB110 may transmit static resource partitioning information (SRPI) 390 to UE 120. UE120 may transmit sounding reference signals (SRS) 392 to eNB110.

Example Regional and Narrow Band CRS for UE Relays

Figure 4:
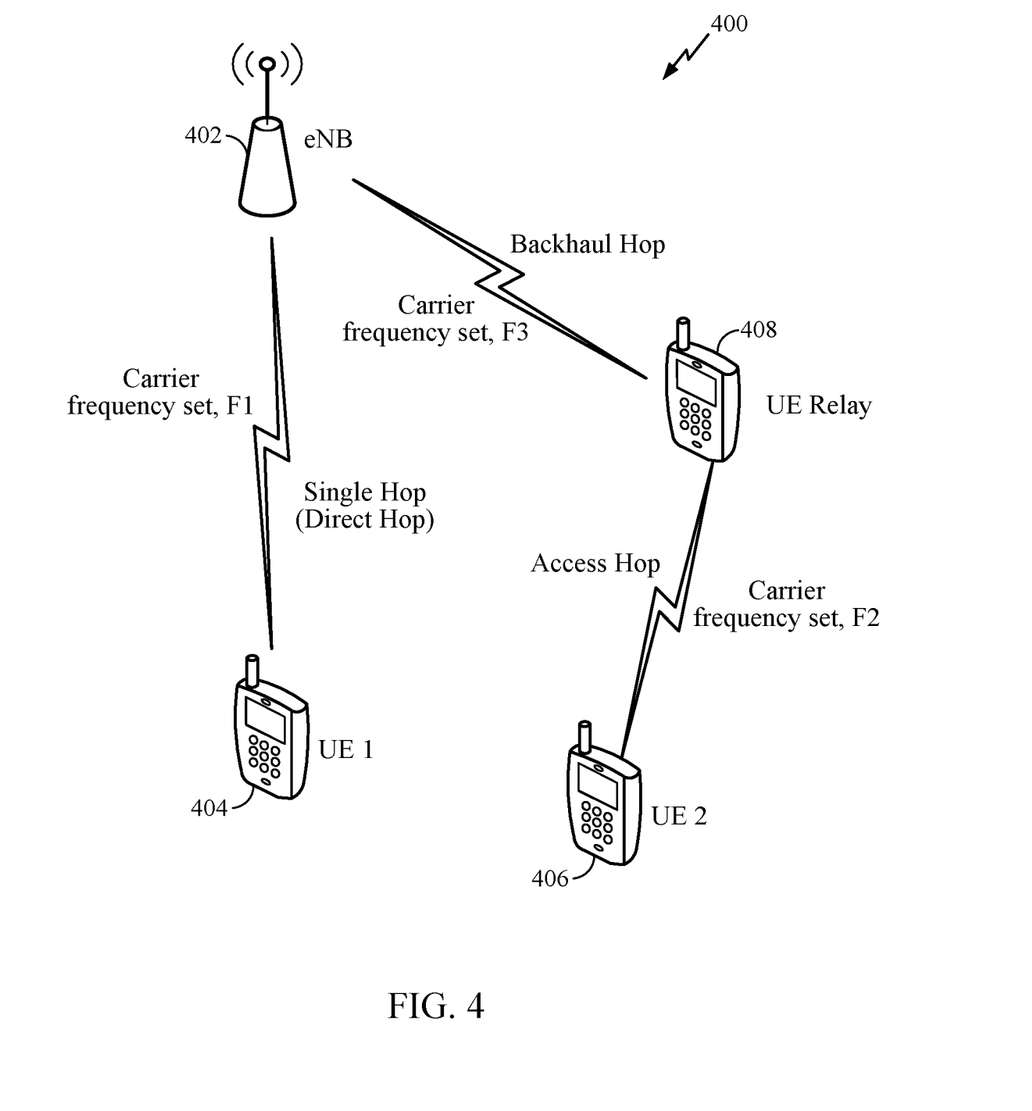
FIG. 4 illustrates an example network deploying a UE relay, in accordance with certain aspects of the present disclosure.

In certain aspects, UE relays may be deployed to enhance cell coverage and throughput. For example, FIG. 4 illustrates an example network 400 deploying a UE relay in accordance with certain aspects of the present disclosure. Network 400 includes an eNB 402 capable of communicating with UEs 404, 406, and 408. The eNB 402 directly communicates (direct hop/single hop) with UE 404 using carrier frequency set F1. The eNB 402 communicates with UE 406 via UE relay 408. UE relay 408 facilitates communication between eNB 402 and UE 406 by relaying data between these two nodes. eNB 402 and UE relay 408 communicate using carrier frequency set F3 (backhaul hop). Further, UE relay 408 communicates with UE 406 using carrier frequency set F2 (Access hop).

In certain aspects, F2 may be disjoint from F3 (out-of-band relay), wherein F1 and F2 may be licensed frequencies and F3 may be unlicensed frequency. In an aspect, UE relay 408 may utilize LTE standard design, e.g. under F2 or F3 links depending on the deployment scenarios.

In certain aspects, in order for the relay UE 408 to be practically feasible and beneficial from a performance perspective, there should typically be a fairly large number of UEs in a network 400 that may be potentially used as UE relays. This is because the transmission power of UEs is generally low (since UEs typically run on battery power) and thus, if the density of the UEs that may be used as relays is less, the link between two UEs may be very weak and efficient communication may not be possible. However, a large number of relay UEs in active transmissions within a small area may lead to increased interference for eNBs. Thus, there is a need to reduce interference among relay UEs and regular eNBs.

Further, in certain aspects, since UE relays are typically power constrained due to use of battery power, there is a need to reduce power consumption in relay UEs.

Additionally, in certain aspects, UEs served by relay UEs need appropriate reference signals for measurement of a link between the UEs and the UE relays serving them and/or demodulation (e.g. control channel, PBCH etc). Thus, there is also a need to provide a reference signal to the UEs for measurement and/or demodulation purposes.

In certain aspects, the transmission of common reference signal (CRS) by the UE relay 408 may be combined with transmission of one or more channels/signals, e.g. PSS, SSS, PBCH and PDCCH. In certain aspects, the amount/configuration of CRS in a subframe transmitted from a UE relay may be based on a type of one or more channels to be transmitted in the subframe along with the CRS and/or a usage of the CRS at the UE receiving the CRS. In an aspect, minimum possible CRS resources may be allocated for carrying out a required function by limiting a length of transmission and/or bandwidth of transmission of the CRS.

Figure 5:
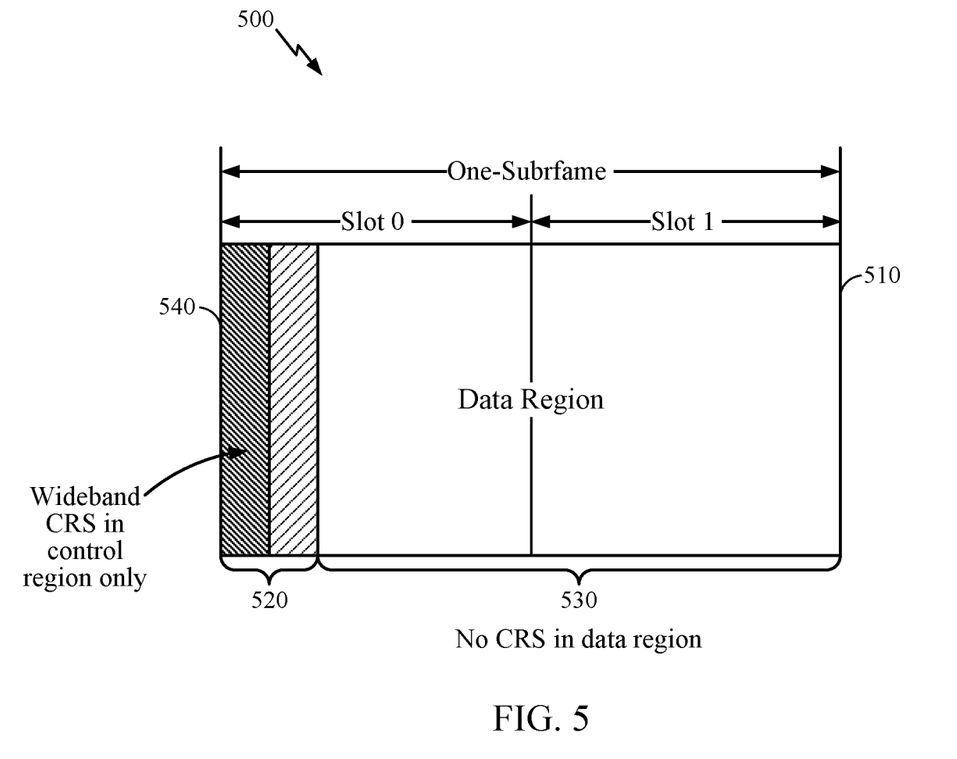
FIG. 5 illustrates an example CRS resource configuration for a subframe transmitting PDCCH only, in accordance with certain aspect of the present disclosure.

In a first aspect, a subframe to be transmitted from a UE relay (e.g. UE relay 408) may include PDCCH only with no PSS, SSS or PBCH. In this case the receiving UE may not need to perform any synchronization measurement but may need to decode/demodulate PDCCH and/or measure link between the UE relay and the UE. FIG. 5 illustrates an example CRS resource configuration 500 for a subframe transmitting PDCCH only, in accordance with certain aspect of the present disclosure. As shown in FIG. 5, subframe 510 generally includes a control region 520 and a data region 530. The PDCCH is typically transmitted in the first few symbols of the control region 520 and is distributed across the entire bandwidth allocated to the subframe. Thus, the CRS may also need to be distributed across substantially the entire bandwidth of the subframe for effective decoding of the PDCCH. However, the CRS may not be required to span over the entire length of the subframe, since PDCCH is transmitted over the first few symbols only of the control region. Thus, in this aspect, the CRS may be transmitted using wideband resources 540 that span only a portion of the control region 520. For example, the CRS resources 540 may be wide band resources over the first symbol of the control region 520. It may be assumed for this aspect that UE uses a different reference signal for decoding data (e.g. PDSCH). In an aspect, the CRS may be used by a UE for both decoding the PDCCH, and for measurement of the link between the UE and the UE relay transmitting the subframe.

Figure 6:
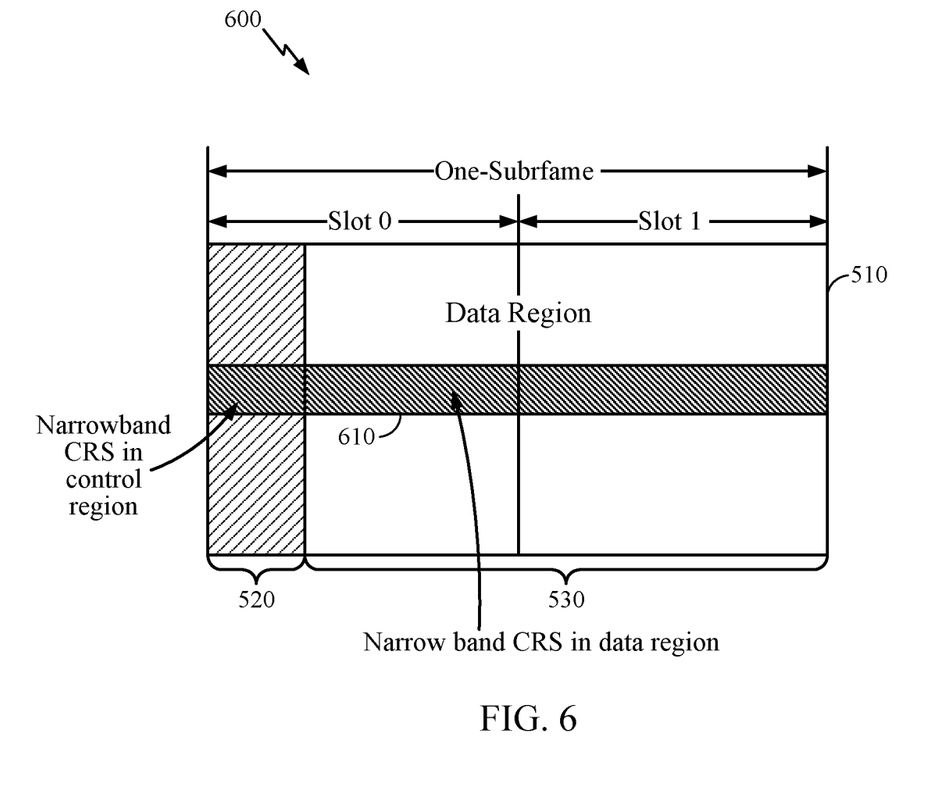
FIG. 6 illustrates an example CRS resource configuration for a subframe transmitting PSS, SSS or PBCH but not PDCCH, in accordance with certain aspect of the present disclosure.

In a second aspect, a subframe to be transmitted from a UE relay (e.g. UE relay 408) may include PSS, SSS or PBCH, but no PDCCH. In this case the receiving UE may not need to decode PDCCH, but may need to decode PBCH and/or measure the link between the UE relay and the UE. FIG. 6 illustrates an example CRS resource configuration 600 for a subframe transmitting PSS, SSS or PBCH but not PDCCH, in accordance with certain aspect of the present disclosure. The PBCH e.g. is typically transmitted in center few resource blocks (RBs) over the entire length of the subframe. Thus, the CRS may also need to be transmitted across substantially the entire length of the subframe for effective decoding of the PBCH. However, the CRS may not be required to span across the entire bandwidth of the subframe, since PBCH is transmitted over the center few RBs only. Thus, in this aspect, the CRS may be transmitted using narrow band resources 610 that span across substantially the entire length of the subframe. For example, the CRS resources 610 may be narrow band resources over the center few RBs of the subframe spanning substantially the entire length of the subframe. In an aspect, the CRS may be used by a UE for both decoding the PBCH, and for measurement of the link between the UE and the UE relay transmitting the subframe.

Figure 7:
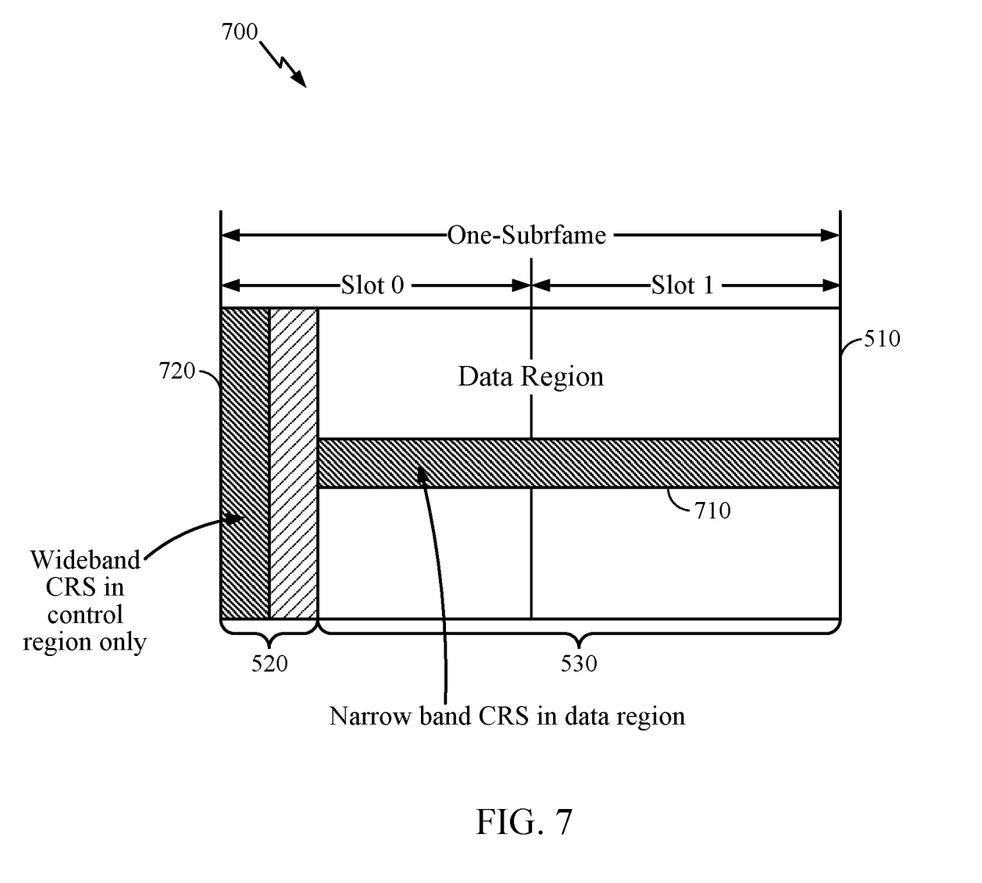
FIG. 7 illustrates an example CRS resource configuration for a subframe transmitting both PDCCH, and at least one of PSS, SSS or PBCH, in accordance with certain aspect of the present disclosure.

In a third aspect, a subframe to be transmitted from a UE relay (e.g. UE relay 408) may include both PDCCH, and PSS, SSS or PBCH. In this case the receiving UE may need to decode both PDCCH and PBCH. FIG. 7 illustrates an example CRS resource configuration for a subframe transmitting both PDCCH, and PSS, SSS or PBCH, in accordance with certain aspect of the present disclosure. In this aspect, the CRS may be transmitted using narrow band resources 710 in the data region and wideband resource 720 in the control region. In an aspect, the CRS may be used by a UE for both decoding the PBCH and PDCCH, and for measurement of the link between the UE and the UE relay transmitting the subframe.

Figure 8:
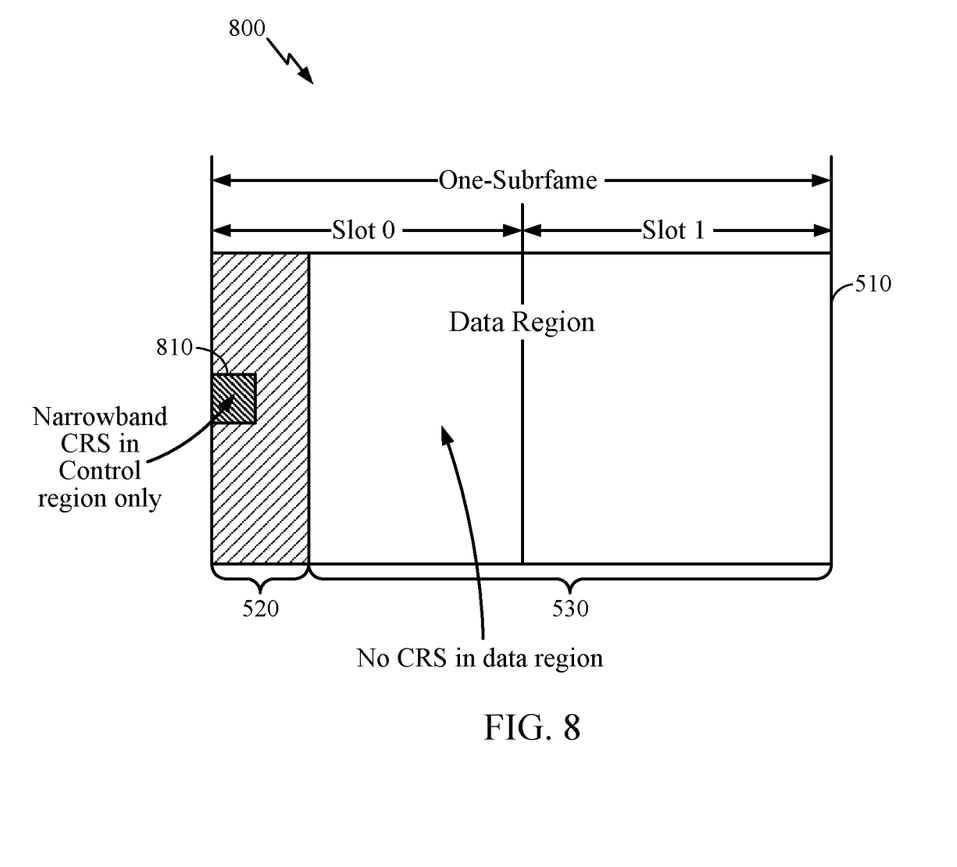
FIG. 8 illustrates an example CRS resource configuration for a subframe transmitting none of PDCCH, PSS, SSS or PBCH, in accordance with certain aspect of the present disclosure.

In a fourth aspect, a subframe to be transmitted from a UE relay (e.g. UE relay 408) may include none of PDCCH, PSS, SSS or PBCH. In this case the receiving UE may not need to decode PDCCH or PBCH, and may only need to measure the link between the UE and the UE relay (e.g. for handover purposes). FIG. 8 illustrates an example CRS resource configuration 800 for a subframe transmitting none of PDCCH, PSS, SSS or PBCH, in accordance with certain aspect of the present disclosure. In this aspect, the CRS may be transmitted using narrow band resources 810 only in the control region 520 with no CRS transmission in the data region 530.

Thus, as shown above, all four aspects try to use minimum possible resources for transmission of CRS in an attempt to reduce interference, reduce power consumption while providing appropriate reference for channel measurement and demodulation.

In certain aspects, the UE relay may choose to transmit on a smaller set of CRS ports (e.g. only 1 port CRS) when only channel measurement is required. For example the UE relay may transmit only port 0. In a further aspect, the UE relay may choose to transmit multiple ports (e.g. 2 ports) when demodulation is required to improve performance.

In certain aspects, the above discussed aspects may be applicable to other scenarios, such as CoMP green (energy efficient) base stations, new carrier types (e.g. extension carriers), low cost devices, device to device communications, etc.

In certain aspects, if Relay PDCCH (R-PDCCH) or Enhanced PDCCH (E-PDCCH) is used, and UE-RS is used to demodulate the R/E-PDCCH, CRS may not necessarily be transmitted for the R/E-PDCCH decoding purpose (e.g. treat the subframe as a PDCCH-less subframe from CRS management perspective).

Figure 9:
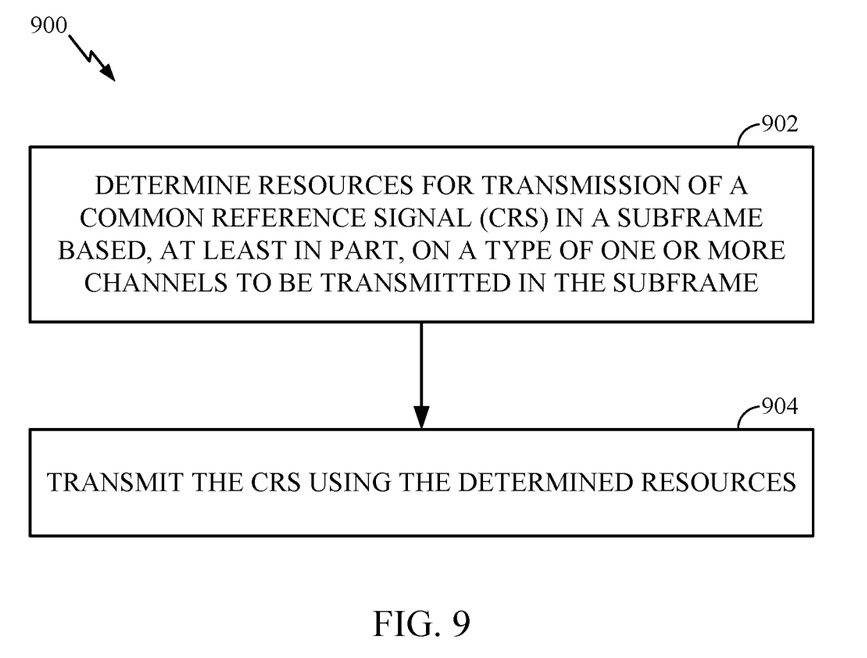
FIG. 9 illustrates example operations that may be performed by a UE relay station, in accordance with certain aspects of the disclosure.

FIG. 9 illustrates example operations 900 that may be performed, for example, by a wireless node, in accordance with certain aspects of the disclosure. In an aspect, the wireless node may include a UE relay station. Operations 900 may begin, at 902, by determining resources for transmission of a common reference signal (CRS) in a subframe based, at least in part, on a type of one or more channels to be transmitted in the subframe. At 904, the CRS may be transmitted using the determined resources.

In an aspect, the determined resources may include a narrowband portion of overall bandwidth allocated to the subframe. In an aspect the narrowband resources span a length of the subframe if at least one of a PBCH, PSS, or SSS is to be transmitted in the subframe, wherein the length spans both a control region and a data region.

In an aspect, the narrowband resources span only a portion of a control region of the subframe if none of PBCH, PSS, SSS, and PDCCH is to be transmitted in the subframe.

In an aspect, the determined resources further include wideband resources that span only a portion of a control region of the subframe if a PDCCH is also to be transmitted in the subframe. In an aspect the determined resources span a first symbol length of the control region.

In an aspect, the determined resources include wideband resources that span only a portion of a control region of the subframe if a PDCCH is to be transmitted in the subframe.

In an aspect, the wireless node may be a low power class node.

Figure 10:
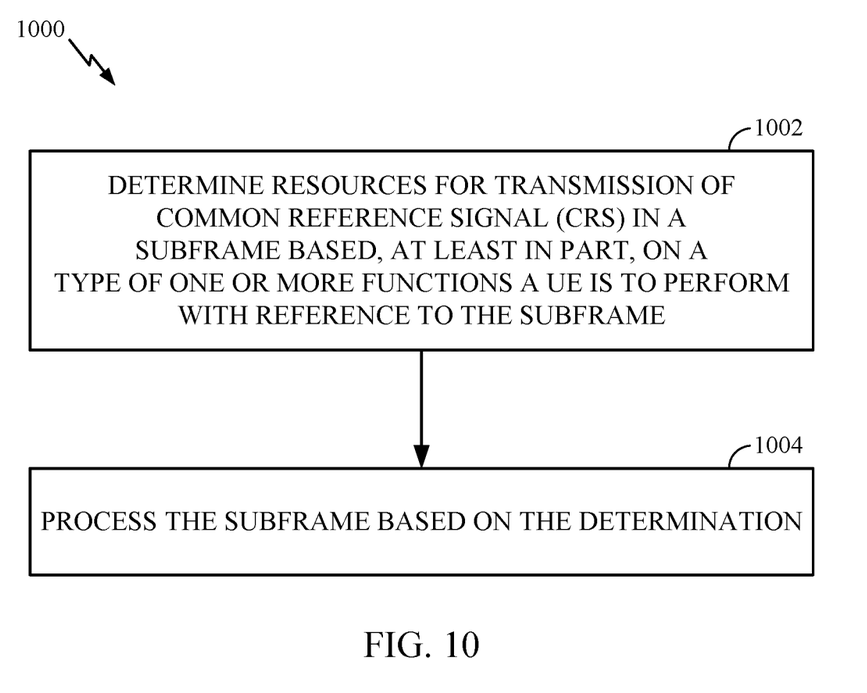
FIG. 10 illustrates example operations that may be performed by a UE, in accordance with certain aspects of the disclosure.

FIG. 10 illustrates example operations 1000 that may be performed, for example, by a UE, in accordance with certain aspects of the disclosure. Operations 1000 may begin, at 1002, by determining resources available for transmission of common reference signal (CRS) in a subframe based, at least in part, on a type of one or more functions the UE is to perform with reference to the subframe. At 1004 the subframe may be processed based on the determination.

In an aspect, the one or more functions include measuring channel quality based on the CRS.

In an aspect, the determined resources include a narrowband portion of overall bandwidth allocated to the subframe.

In an aspect, the narrowband resources span a length of the subframe if the one or more functions comprise decoding at least one of a PBCH, PSS, or SSS transmitted in the subframe, wherein the length spans both a control region and a data region.

In an aspect, the narrowband resources span only a portion of a control region of the subframe if the one or more functions comprise decoding none of PBCH, PSS, SSS, and PDCCH.

In an aspect, the determined resources further include wideband resources that span only a portion of a control region of the subframe if the one or more functions also include decoding a PDCCH transmitted in the subframe.

In an aspect, the determined resources include wideband resources that span only a portion of a control region of the subframe if one or more functions the UE is to perform include decoding of a PDCCH. In an aspect, the determined resources span a first symbol length of the control region.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits and algorithm steps described in connection with the disclosure herein may be implemented as electronic hardware, computer software, or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general-purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination of the two. A software/firmware module may reside in RAM memory, flash memory, ROM memory, EPROM memory, EEPROM memory, registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Generally, where there are operations illustrated in Figures, those operations may have corresponding counterpart means-plus-function components with similar numbering.

In one or more exemplary designs, the functions described may be implemented in hardware, software/firmware or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of wireless communications by a wireless node, the method comprising:
   determining a minimum amount of narrowband resources for transmission of a common reference signal (CRS) in a subframe to at least one User Equipment (UE) configured for wideband operation based, at least in part, on a type of one or more channels to be transmitted in the subframe, wherein the minimum amount of narrowband resources for transmission of the CRS is required by the at least one UE to perform one or more functions relating to the one or more channels and the one or more functions comprise measuring channel quality based on the narrowband resources; and
   transmitting the CRS using the determined resources.

2. The method of claim 1, wherein the determined narrowband resources comprise a narrowband portion of overall bandwidth allocated to the subframe.

3. The method of claim 1, wherein:
   the determined narrowband resources span a length of the subframe if at least one of a physical broadcast channel (PBCH), primary synchronization signal (PSS), or secondary synchronization signal (SSS) is to be transmitted in the subframe, wherein the length spans both a control region and a data region.

4. The method of claim 1, wherein:
   the determined narrowband resources span only a portion of a control region of the subframe if none of a physical broadcast channel (PBCH), primary synchronization signal (PSS), secondary synchronization signal (SSS), and physical downlink control channel (PDCCH) is to be transmitted in the subframe.

5. An apparatus for wireless communications, comprising:
   means for determining a minimum amount of narrowband resources for transmission of a common reference signal (CRS) in a subframe to at least one User Equipment (UE) configured for wideband operation, based, at least in part, on one or more channels to be transmitted in the subframe, wherein the minimum amount of narrowband resources for transmission of the CRS is required by the at least one UE to perform one or more functions relating to the one or more channels and the one or more functions comprise measuring channel quality based on the narrowband resources; and
   means for transmitting the CRS using the determined narrowband resources.

6. The apparatus of claim 5, wherein the determined narrowband resources comprise a narrowband portion of overall bandwidth allocated to the subframe.

7. The apparatus of claim 5, wherein:
   the determined narrowband resources span a length of the subframe if at least one of a physical broadcast channel (PBCH), primary synchronization signal (PSS), or secondary synchronization signal (SSS) is to be transmitted in the subframe, wherein the length spans both a control region and a data region.

8. The apparatus of claim 5, wherein:
   the determined narrowband resources span only a portion of a control region of the subframe if none of a physical broadcast channel (PBCH), primary synchronization signal (PSS), secondary synchronization signal (SSS), and physical downlink control channel (PDCCH) is to be transmitted in the subframe.

9. An apparatus for wireless communications, comprising:
   at least one processor, and
   memory coupled to the at least one processor, the memory comprising instructions executable by the at least one processor to cause the apparatus to:
      determine a minimum amount of narrowband resources for transmission of a common reference signal (CRS) in a subframe to at least one User Equipment (UE) configured for wideband operation, based, at least in part, on one or more channels to be transmitted in the subframe, wherein the minimum amount of narrowband resources for transmission of the CRS is required by the at least one UE to perform one or more functions relating to the one or more channels and the one or more functions comprise measuring channel quality based on the narrowband resources; and
      transmit the CRS using the determined narrowband resources.

10. A non-transitory computer-readable medium having instructions stored thereon which, when executed by one or more processors, performs an operation for wireless communications, the operation comprising:
    determining an amount of narrowband resources for transmission of a common reference signal (CRS) in a subframe to at least one User Equipment (UE) configured for wideband operation, based, at least in part, on one or more channels to be transmitted in the subframe, wherein the minimum amount of narrowband resources for transmission of the CRS is required by the at least one UE to perform one or more functions relating to the one or more channels and the one or more functions comprise measuring channel quality based on the narrowband resources; and transmitting the CRS using the determined narrowband resources.

11. A method of wireless communications by a User Equipment (UE) configured for wideband operation, the method comprising:
receiving a common reference signal (CRS) in a subframe;
determining a minimum amount of narrowband resources used for transmission of the CRS in the subframe based, at least in part, on one or more functions the UE is to perform with reference to one or more channels received in the subframe, wherein the minimum amount of the narrowband resources for transmission of the CRS is required for performing the one or more functions with reference to the one or more channels and the one or more functions comprise measuring channel quality based on the narrowband resources; and
processing the subframe based on the determination.

12. The method of claim 11, wherein the determined narrowband resources comprise a narrowband portion of overall bandwidth allocated to the subframe.

13. The method of claim 11, wherein:
the determined narrowband resources span a length of the subframe if the one or more functions comprise decoding at least one of a physical broadcast channel (PBCH), primary synchronization signal (PSS), or secondary synchronization signal (SSS) transmitted in the subframe, wherein the length spans both a control region and a data region.

14. The method of claim 11, wherein:
the determined narrowband resources span only a portion of a control region of the subframe if the one or more functions comprise decoding none of a physical broadcast channel (PBCH), primary synchronization signal (PSS), secondary synchronization signal (SSS), and physical downlink control channel (PDCCH).

15. An apparatus for wireless communications configured for wideband operation, comprising:
means for receiving a common reference signal (CRS) in a subframe;
means for determining an amount of narrowband resources used for transmission of the received CRS in the subframe based, at least in part, on one or more functions a UE is to perform with reference to one or more channels received in the subframe, wherein the minimum amount of the narrowband resources for transmission of the CRS is required for performing the one or more functions with reference to the one or more channels and the one or more functions comprise measuring channel quality based on the narrowband resources; and
means for processing the subframe based on the determination.

16. The apparatus of claim 15, wherein the determined narrowband resources comprise a narrowband portion of overall bandwidth allocated to the subframe.

17. The apparatus of claim 15, wherein:
the determined narrowband resources span a length of the subframe if the one or more functions comprise decoding at least one of a physical broadcast channel (PBCH), primary synchronization signal (PSS), or secondary synchronization signal (SSS) transmitted in the subframe, wherein the length spans both a control region and a data region.

18. The apparatus of claim 15, wherein:
the determined narrowband resources span only a portion of a control region of the subframe if the one or more functions comprise decoding none of a physical broadcast channel (PBCH), primary synchronization signal (PSS), secondary synchronization signal (SSS), and physical downlink control channel (PDCCH).

19. An apparatus for wireless communications configured for wideband operation, comprising:
at least one processor, and
memory coupled to the at least one processor, the memory comprising instructions executable by the at least one processor to cause the apparatus to:
receive a common reference signal (CRS) in a subframe;
determine a minimum amount of narrowband resources used for transmission of the received CRS in the subframe based, at least in part, on one or more functions a UE is to perform with reference to one or more channels received in the subframe, wherein the minimum amount of the narrowband resources for transmission of the CRS is required for performing the one or more functions with reference to the one or more channels and the one or more functions comprise measuring channel quality based on the narrowband resources; and
process the subframe based on the determination.

20. A non-transitory computer-readable medium having instructions thereon which, when executed by one or more processors, performs an operation for wireless communications by a User Equipment (UE) configured for wideband operation, the operation comprising:
receiving a common reference signal (CRS) in a subframe;
determining a minimum amount of narrowband resources used for transmission of the received CRS in the subframe based, at least in part, on one or more functions a UE is to perform with reference to one or more channels received in the subframe, wherein the minimum amount of the narrowband resources for transmission of the CRS is required for performing the one or more functions with reference to the one or more channels and the one or more functions comprise measuring channel quality based on the narrowband resources; and
processing the subframe based on the determination.

* * * * *